(12) United States Patent
Kaneko et al.

(10) Patent No.: US 11,485,386 B2
(45) Date of Patent: Nov. 1, 2022

(54) VEHICLE, INFORMATION PROCESSING APPARATUS, METHOD OF INFORMATION PROCESSING, AND PROGRAM FOR PROVIDING ARTICLE FROM A VEHICLE TO ANOTHER VEHICLE TO AVOID TRAVEL INABILITY

(71) Applicant: TOYOTA JIDOSHA KABUSHIKI KAISHA, Toyota (JP)

(72) Inventors: Nozomi Kaneko, Nagoya (JP); Hiromichi Dogishi, Nagoya (JP); Masaki Shitara, Nagakute (JP); Keiji Yamashita, Nisshin (JP); Naoki Yamamuro, Nagoya (JP); Shunsuke Tanimori, Susono (JP); Ryoichi Shiraishi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/789,473

(22) Filed: Feb. 13, 2020

(65) Prior Publication Data
US 2020/0269879 A1 Aug. 27, 2020

(30) Foreign Application Priority Data
Feb. 22, 2019 (JP) .............................. JP2019-030456

(51) Int. Cl.
*B60W 60/00* (2020.01)
*B60W 30/09* (2012.01)

(52) U.S. Cl.
CPC ...... *B60W 60/00256* (2020.02); *B60W 30/09* (2013.01); *B60W 60/005* (2020.02); *B60W 60/0018* (2020.02); *B60W 60/0021* (2020.02)

(58) Field of Classification Search
CPC ......... B60W 60/00256; B60W 60/005; B60W 60/0018; B60W 60/0021; B60W 30/09; B60W 60/00274; B60W 60/0059
See application file for complete search history.

(56) References Cited

U.S. PATENT DOCUMENTS

| 2017/0089446 A1* | 3/2017 | Worden ............... G07C 5/0808 |
| 2017/0225662 A1* | 8/2017 | Newman ............. H01M 10/613 |
| 2018/0025635 A1* | 1/2018 | Cheaz .................. G05D 1/0297 701/23 |
| 2018/0096602 A1* | 4/2018 | She ....................... B60W 10/04 |

(Continued)

FOREIGN PATENT DOCUMENTS

| JP | 2008-204130 A | 9/2008 |
| JP | 2012-152018 A | 8/2012 |

(Continued)

*Primary Examiner* — James J Lee
*Assistant Examiner* — Steven Vu Nguyen
(74) *Attorney, Agent, or Firm* — Oblon, McClelland, Maier & Neustadt, L.L.P.

(57) ABSTRACT

A vehicle includes a control unit. The control unit is configured to execute: outputting, when detecting or estimating travel inability of an own vehicle, information regarding a request for receiving an article provided from another vehicle to avoid the travel inability. The control unit performs, when determining that a request vehicle outputs the information regarding the request, a prescribed process for providing an article corresponding to the request to the request vehicle.

13 Claims, 6 Drawing Sheets

(56) References Cited

U.S. PATENT DOCUMENTS

2018/0217598 A1    8/2018  Kuhara
2019/0172278 A1*   6/2019  Castro Duran .......... G07C 5/12
2019/0270387 A1*   9/2019  Dudar ..................... B60L 50/13

FOREIGN PATENT DOCUMENTS

JP          2015-92320 A      5/2015
JP          2018-124676 A     8/2018

* cited by examiner

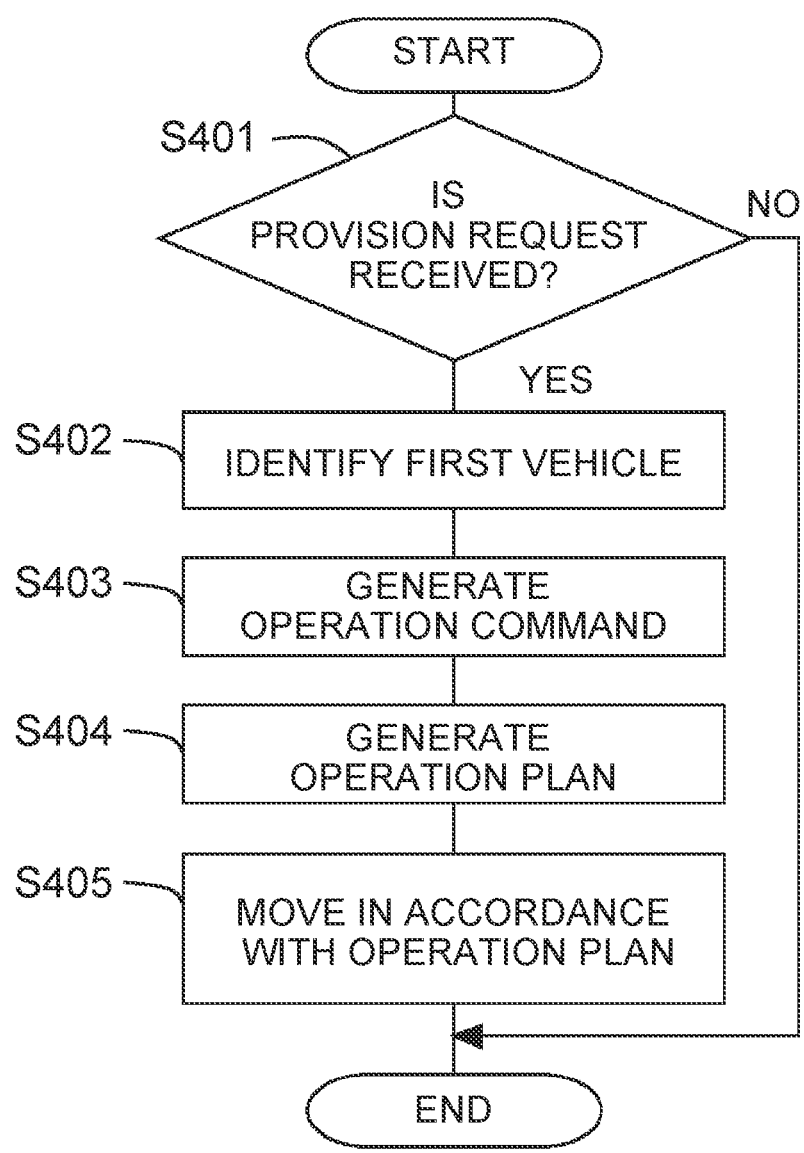

VEHICLE, INFORMATION PROCESSING APPARATUS, METHOD OF INFORMATION PROCESSING, AND PROGRAM FOR PROVIDING ARTICLE FROM A VEHICLE TO ANOTHER VEHICLE TO AVOID TRAVEL INABILITY

INCORPORATION BY REFERENCE

The disclosure of Japanese Patent Application No. 2019-030456 filed on Feb. 22, 2019 including the specification, drawings and abstract is incorporated herein by reference in its entirety.

BACKGROUND

1. Technical Field

The present disclosure relates to a vehicle, an information processing apparatus, a method of information processing, and a program.

2. Description of Related Art

There is known a system configured to confirm whether or not delivery of a package by a mobile object that travels autonomously is possible, when the delivery of the package by the mobile object that travels autonomously is specified as a delivery method (see, for example, Japanese Patent Application Publication No. 2018-124676 (JP 2018-124676 A)).

SUMMARY

Although a mobile object that delivers a package is described in JP 2018-124676 A, there is no description about other services. Accordingly, the system disclosed in JP 2018-124676 A has room for improvement if the system is applied to other services. An object of the present disclosure is to achieve longer operation of vehicles by causing the vehicles to provide components to each other.

One aspect of the present disclosure relates to a vehicle including a control unit. The control unit is configured to execute: detecting or estimating travel inability of an own vehicle that travels autonomously; outputting, when detecting or estimating the travel inability of the own vehicle, information regarding a request for receiving an article provided from another vehicle to avoid the travel inability; determining that a request vehicle that is other than the own vehicle outputs the information regarding the request; and performing, when determining that the request vehicle outputs the information regarding the request, a prescribed process for providing an article corresponding to the request to the request vehicle, the article being included in the own vehicle.

One aspect of the present disclosure relates to an information processing apparatus including a control unit. The control unit is configured to execute: selecting, when detecting or estimating travel inability of a first vehicle that travels autonomously, a second vehicle that travels autonomously and that is able to provide an article for avoiding the travel inability to the first vehicle; and generating an operation command commanding the second vehicle to move to a location where the second vehicle provides the article to the first vehicle and to provide the article; and transmitting the operation command to the second vehicle.

One aspect of the present disclosure relates to a method of information processing. The method causes a computer to execute: detecting or estimating travel inability of an own vehicle that travels autonomously; outputting, when detecting or estimating the travel inability of the own vehicle, information regarding a request for receiving an article provided from another vehicle to avoid the travel inability; determining that a request vehicle that is other than the own vehicle outputs the information regarding the request; and performing, when determining that the request vehicle outputs the information regarding the request, a prescribed process for providing an article corresponding to the request to the request vehicle, the article being included in the own vehicle.

One aspect of the present disclosure relates to a program causing a computer to execute: detecting or estimating travel inability of an own vehicle that travels autonomously; outputting, when detecting or estimating the travel inability of the own vehicle, information regarding a request for receiving an article provided from another vehicle to avoid the travel inability; determining that a request vehicle that is other than the own vehicle outputs the information regarding the request; and performing, when determining that the request vehicle outputs the information regarding the request, a prescribed process for providing an article corresponding to the request to the request vehicle, the article being included in the own vehicle.

The present disclosure can achieve longer operation of vehicles by causing the vehicles to provide components to each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is an example of the flowchart of a process where a second vehicle provides a component to the first vehicle according to the second embodiment.

DETAILED DESCRIPTION OF EMBODIMENTS

Figure 1:
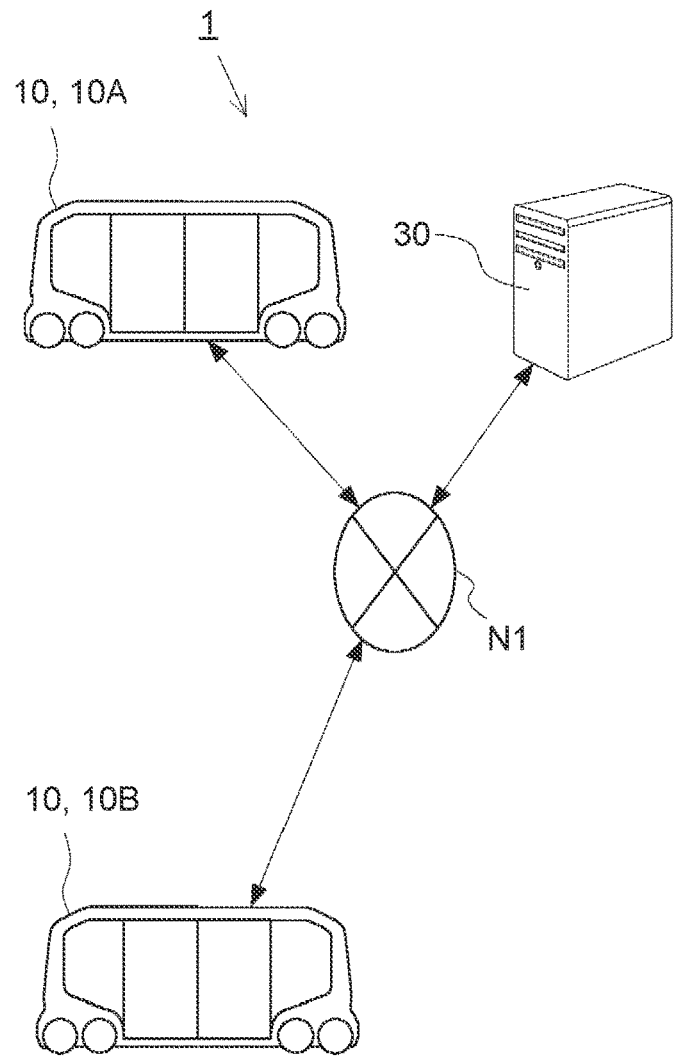
FIG. 1 shows a schematic configuration of an autonomous driving system according to a first embodiment.

Vehicles according to the present disclosure are each able to travel autonomously. The vehicles can also detect or estimate travel inability of the own vehicles. Examples of the situations that cause travel inability of the vehicles may include failure of components relating to travel, decrease in function of the components relating to travel, decrease in state of charge (SOC) of a battery in the case of electric vehicles, shortage of fuel (gasoline, light oil) in the case of vehicles with an engine as a driving source, and occurrence of slips due to snowfall. For example, when a sensor detects failure of a component relating to travel, the travel inability of the vehicle is detectable. For example, when the SOC of the battery or the remaining amount of fuel is detected, and the detected SOC of the battery is equal to or less than a threshold, or the remaining amount of fuel is equal to or less than a threshold, the travel inability of the own vehicle can be estimated. When snowfall is detected, or when snowfall information is obtained from weather reports, and the own vehicle is not equipped with chains, the travel inability of the own vehicle can be estimated. Detecting or estimating the travel inability of the vehicle includes, for example, detecting the need to replace components, for example. For example, the own vehicle determines whether or not the function of any component included in the own vehicle is decreased based on a detection value of a sensor or the like. When the function is decreased, the need of replacing the component is determined.

An external server can detect or estimate the travel inability of the vehicle. More specifically, the vehicle can transmit a detection value of the sensor or the like to a server, and the server can detect or estimate the travel inability of the vehicle based on the detection value. When detecting or estimating the travel inability of the own vehicle, the vehicle outputs information regarding a request for receiving an article provided from another vehicle to avoid the travel inability. Upon reception of the information, the other vehicle provides the article to the vehicle that transmitted the information. Examples of the article used to avoid the travel inability include substitutes of damaged components, batteries, fuel, and chains. The article may be provided in a factory, or at the locations, such as roads, and parking lots, where the vehicle can park.

The vehicles can provide articles to each other. For example, when decrease in function of a component occurs in an own vehicle, the own vehicle can receive a substitute from another vehicle, which enables the vehicle to travel. When a request vehicle outputs information regarding a request, the own vehicle provides the requested article to the request vehicle. To provide the article to the request vehicle, the own vehicle perform a prescribed process. Examples of the prescribed process include a process of generating an operation command for the own vehicle to move to the current location of the request vehicle, and a process of moving the own vehicle in accordance with the operation command.

The article provided by the own vehicle to the request vehicle is an article usable in the request vehicle. The article provided by the own vehicle is an article that does not hinder the own vehicle from maintaining its travelable state even when the own vehicle provides the article to the request vehicle. For example, an excessive number of components may be mounted on the vehicle so as to allow provision of the excessive components. For example, fuel or a battery may be provided to the request vehicle within the range that the own vehicle is able to travel. Depending on operation purpose of the own vehicle, some articles may become unnecessary, and these unnecessary articles may be provided to the request vehicle.

Thus, provision of an article to the request vehicle can prevent travel inability of the request vehicle, or can release the request vehicle from the travel inability. Accordingly, a movable distance and a movable time of the request vehicle can be lengthened. In other words, longer operation of the request vehicle can be achieved. The article may also be provided based on an instruction from an external server.

Hereinafter, the embodiments of the present disclosure will be described with reference to the drawings. The configurations of the following embodiments are illustrative, and are not intended to limit the present disclosure. The following embodiments may be combined as much as possible.

First Embodiment

Outline of Autonomous Driving System

FIG. 1 shows a schematic configuration of an autonomous driving system 1 according to the present embodiment. The autonomous driving system 1 includes, for example, a plurality of vehicles 10 and a server 30. In the example of FIG. 1, the vehicles 10 include a first vehicle 10A and a second vehicle 10B.

The autonomous driving system 1 is a system in which when, for example, there is a vehicle 10 (hereinafter, also called a first vehicle 10A) that detects or estimates its travel inability, the vehicle 10A receives an article provided by another vehicle 10 (hereinafter, also called a second vehicle 10B) so as to lengthen the travel distance of the first vehicle 10A or to enable the first vehicle 10A to travel. In the following description, the travel inability of the first vehicle 10A is caused by decrease in function of a component in the first vehicle 10A. In this case, the second vehicle 10B provides a substitute component to the first vehicle 10A. The decrease in function of a component indicates the state where the component is unable to demonstrate the performance essentially expected to demonstrate. Examples of the decrease in function of the component include failure of the component, and a low SOC of the battery when the component is the battery. Detecting the decrease in function of the component includes, for example, detecting the need to replace the component, for example. Examples of the component include assembly components, and modules. For example, the first vehicle 10A determines whether or not decrease in function of a components included in the first vehicle 10A occurs based on a detection value of a sensor or the like. For example, when the detection value of the sensor is out of an allowable range, the first vehicle 10A determines that the decrease in function of the component occurs.

The first vehicle 10A is an example of a request vehicle. The component (substitute component) provided to the first vehicle 10A by the second vehicle 10B is a component usable in both the vehicles 10 including the first vehicle 10A and the second vehicle 10B. For example, in the case of travel inability or a high possibility of travel inability of the first vehicle 10A due to the battery having an insufficient SOC, the second vehicle 10B provides a spare battery to the first vehicle 10A so as to achieve a lengthened travelable distance or travelable time of the first vehicle 10A. In this case, when the second vehicle 10B provides the first vehicle 10A with some of the batteries mounted on the second vehicle 10B, the second vehicle 10B can also continue to travel. Thus, when the second vehicle 10B provides a component to the first vehicle 10A within the range where the second vehicle 10B can maintain a travelable state, it becomes possible to eliminate the necessity of transporting the first vehicle 10A by use of a wrecker truck or the like, for example.

The vehicles 10 and the server 30 are mutually connected through a network N1. The network N1 is, for example, a worldwide public communication network such as the Internet. As the network N1, a wide area network (WAN) or other communication networks may also be adopted. The network N1 may also include telephone communication networks such as cellular phone communication networks, and wireless communication networks such as Wi-Fi.

Figure 2:
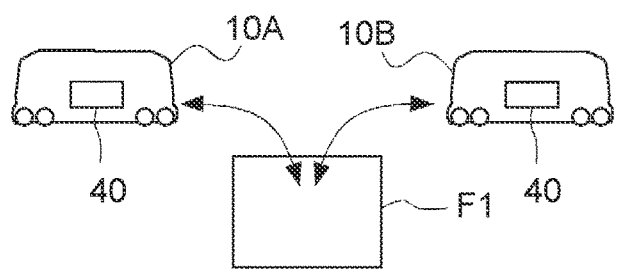
FIG. 2 is an explanatory view about movement of vehicles when a component is transferred in a factory.

The component is transferred between the first vehicle 10A and the second vehicle 10B at roads, parking lots, and factories, for example. FIG. 2 is an explanatory view about movement of the vehicles 10 when a component 40 is transferred in a factory F1. In FIG. 2, decrease in function of the component 40 occurs in the first vehicle 10A. Accordingly, the first vehicle 10A travels to the factory F1, where the first vehicle 10A receives a component 40 provided from the second vehicle 10B. The second vehicle 10B travels to the factory F1, where the second vehicle 10B provides the component 40 to the first vehicle 10A. The factory F1 has a facility necessary for attaching and detaching the component 40. However, the factory F1 is not essential. In the case where the vehicles 10 include the facility necessary for attaching and detaching the component 40, the component 40 can be attached and detached at the locations such as roads or parking lots. The component 40 may be exchanged between the first vehicle 10A and the second vehicle 10B. The component 40 that is attached to the first vehicle 10A may be left as it is, and a new component 40 may be provided to the first vehicle 10A from the second vehicle 10B. The component 40 may be removed from the first vehicle 10A, and be changed or repaired in the factory F1 for recovery of the function.

When detecting decrease in function of the component 40 in the first vehicle 10A, the server 30 selects the second vehicle 10B that can provide the substitute component 40. The information regarding the decrease in function of the component 40 in the first vehicle 10A is provided from the first vehicle 10A. The server 30 selects the second vehicle 10B, out of the vehicles 10 capable of traveling even after providing the component 40 to the first vehicle 10A, based on a prescribed condition. For example, the prescribed condition may be: the vehicle 10 that is currently at the location nearest to the factory F1; the vehicle 10 that is currently at the location within a prescribed range from the factory F1; the vehicle 10 that is nearest to the first vehicle 10A; or the vehicle 10 least affected by providing the component 40. When the server 30 selects the second vehicle 10B, the server 30 generates an operation command for instructing the second vehicle 10B to move to the factory F1 and provide the component 40. The server 30 also generates an operation command for instructing the first vehicle 10A to move to the factory F1 and replace the component 40. The operation command generated by the server 30 is transmitted to each of the vehicles 10 from the server 30. Upon reception of the operation commands, the vehicles 10 travel autonomously in accordance with the operation commands.

Hardware Configuration

Figure 3:
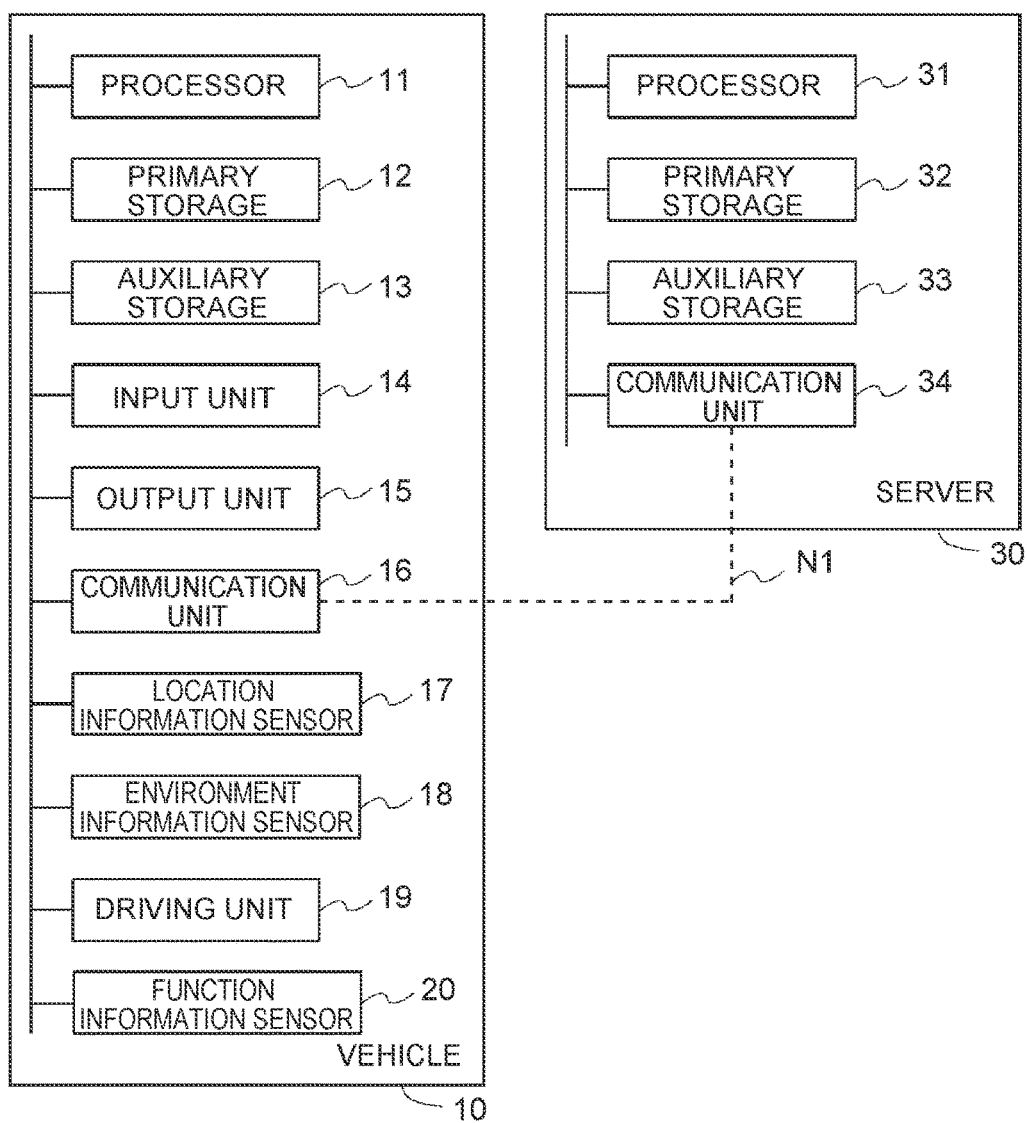
FIG. 3 is a block diagram schematically showing examples of the configurations of a vehicle and a server that constitute an autonomous driving system according to the embodiment.

With reference to FIG. 3, the hardware configuration of the vehicle 10 and the server 30 will be described. FIG. 3 is a block diagram schematically showing examples of the configurations of the vehicle 10 and the server 30 that constitute the autonomous driving system 1 according to the present embodiment.

The server 30 has the configuration of a general computer. The server 30 has a processor 31, a primary storage 32, an auxiliary storage 33, and a communication unit 34. These devices are mutually connected through a bus.

The processor 31 is formed with a central processing unit (CPU), a digital signal processor (DSP), or the like. The processor 31 controls the server 30 to perform various information processing computations. The processor 31 is an example of "control unit." The primary storage 32 is formed with a random access memory (RAM), a read only memory (ROM), or the like. The auxiliary storage 33 is formed with an erasable programmable ROM (EPROM), a hard disk drive (HDD), a removable medium, or the like. The auxiliary storage 33 stores an operating system (OS), various programs, various tables, and the like. The processor 31 loads the programs stored in the auxiliary storage 33 to a work area of the primary storage 32, and executes the loaded programs. Through execution of the programs, the respective component units are controlled. Hence, the server 30 implements the functions corresponding to prescribed purposes. The primary storage 32 and the auxiliary storage 33 are recording media readable with a computer. The server 30 may be a single computer, or may be a device made up of a plurality of computers in cooperation. The information stored in the auxiliary storage 33 may be stored in the primary storage 32. The information stored in the primary storage 32 may be stored in the auxiliary storage 33.

The communication unit 34 is a device for communicating with the vehicles 10 via the network N1. The communication unit 34 is, for example, a local area network (LAN) interface board, or a wireless communication circuit for wireless communication. The LAN interface board or the wireless communication circuit is connected to the network N1.

Although a series of processes executed in the server 30 can be executed by hardware, the processes can also be executed by software. The hardware configuration of the server 30 is not limited to the configuration shown in FIG. 3. Some or all the component members of the server 30 may be mounted on the vehicle 10.

Description is now given of the vehicle 10. The vehicle 10 includes a processor 11, a primary storage 12, an auxiliary storage 13, an input unit 14, an output unit 15, a communication unit 16, a location information sensor 17, an environment information sensor 18, a driving unit 19, and a function information sensor 20. These devices are mutually connected through a bus. Since the processor 11, the primary storage 12, and the auxiliary storage 13 are the same as the processor 31, the primary storage 32, and the auxiliary storage 33 of the server 30, the description thereof is omitted.

The input unit 14 is a device for receiving an input operation performed by a user. Examples of the input unit 14 include a touch panel, and a push button. The output unit 15 is a device for presenting information to the user. Examples of the output unit 15 include a liquid crystal display (LCD), an electro luminescence (EL) panel, a speaker, and a lamp. The input unit 14 and the output unit 15 may be configured as one touch panel display. For example, a user who uses the vehicle 10, or a user who manages the vehicle 10 can use the input unit 14 and the output unit 15. The communication unit 16 is a communication device for connecting the vehicle 10 to the network N1. The communication unit 16 is a circuit for establishing communication with other apparatuses (such as the server 30) via the network N1 by using, for example, mobile communications service (including: telephone communication networks such as 3rd generation (3G), and long term evolution (LTE); and wireless communication such as Wi-Fi).

The location information sensor 17 acquires location information on the vehicle 10 (for example, latitude and longitude) at a prescribed cycle. For example, the location information sensor 17 is a global positioning system (GPS) reception unit, a Wi-Fi communication unit, or the like. The information acquired with the location information sensor 17 is recorded, for example, on the auxiliary storage 13 or the like, and is transmitted to the server 30.

The environment information sensor 18 is a device for sensing the state of the vehicle 10, or sensing the surrounding of the vehicle 10. Examples of the sensor for sensing the state of the vehicle 10 may include an acceleration sensor, a speed sensor, and an azimuth angle sensor. Examples of the sensor for sensing the surrounding of the vehicle 10 may include an image sensor, a laser scanner, a LIDAR, and a radar.

The driving unit 19 makes the vehicle 10 travel based on a control command described later. The driving unit 19 is configured by including, for example, a motor, an inverter, a brake, and a steering mechanism for driving the wheels included in the vehicle 10. When the motor, the brake, and the like are driven in accordance with the control command, autonomous travel of the vehicle 10 is implemented.

The function information sensor 20 is a sensor for detecting the decrease in function of the component 40 included in the vehicle 10, or a sensor for detecting the decrease in function of the vehicle 10. The function information sensor 20 detects, for example, the state of the component 40 of the vehicle 10, or detects failure of the component 40 of the vehicle 10. Examples of the function information sensor 20 may include a sensor for detecting the state of charge (SOC) of the battery, a sensor for detecting the shape of the component 40, a sensor for detecting the location of the component 40, a sensor for detecting a rotation speed of the component 40, a sensor for detecting a movement amount of the component 40.

Functional Configuration: Server

Figure 4:
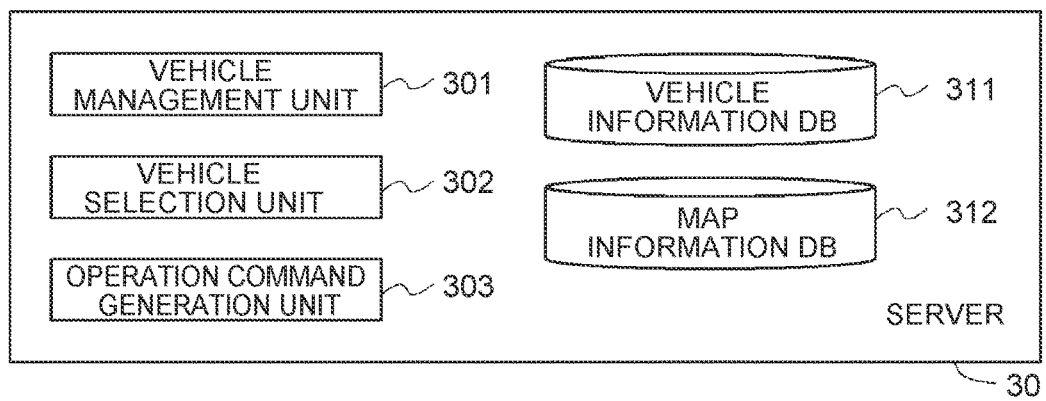
FIG. 4 shows an example of the functional configuration of the server.

FIG. 4 shows an example of the functional configuration of the server 30. The server 30 includes a vehicle management unit 301, a vehicle selection unit 302, an operation command generation unit 303, a vehicle information DB 311, and a map information DB 312 as functional components. The vehicle management unit 301, the vehicle selection unit 302, the operation command generation unit 303 are functional components provided when, for example, the processor 31 of the server 30 executes various programs stored in the auxiliary storage 33.

The vehicle information DB 311 and the map information DB 312 are, for example, relational databases constructed when programs of a database management system (DBMS) executed by the processor 31 manage the data stored in the auxiliary storage 33. Some of the functional components of the server 30 or some of the processes thereof may be executed by other computers connected to the network N1.

The vehicle management unit 301 manages vehicle information. The vehicle information includes location information on the vehicles 10. The location information on the vehicles 10 relates to current locations of the vehicles 10. The vehicle management unit 301 acquires and manages the location information transmitted from the vehicles 10 at a prescribed cycle, or the location information transmitted from the vehicles 10 in response to a request from the server 30, for example. The vehicle management unit 301 stores the location information in association with vehicle IDs in the vehicle information DB 311. The vehicle IDs are identifiers of the vehicles 10 allocated in advance.

Upon reception of a provision request from the first vehicle 10A, the vehicle selection unit 302 selects the second vehicle 10B that provides a substitute component 40 to the first vehicle 10A. The provision request is information including the identifier (vehicle ID) of the first vehicle 10A, and the identifier (components ID) of the component 40. The information is used for requesting to the server 30 provision or replacement of the component 40. The component IDs are allocated to the respective components 40 in advance. Upon reception of the provision request from the first vehicle 10A, the vehicle selection unit 302 can detect decrease in function of the component 40 of the first vehicle 10A. For example, out of the vehicles 10 that do not transmit the provision request, the vehicle selection unit 302 selects such a vehicle 10 as the vehicle 10 nearest to the first vehicle 10A, or the vehicle 10 nearest to the factory F1, as the second vehicle 10B. At the time, the vehicle selection unit 302 selects as the second vehicle 10B the vehicle 10 that can perform operation even with the component 40 being provided to the first vehicle 10A. The vehicle 10 nearest to the first vehicle 10A or the vehicle 10 nearest to the factory F1 can be determined based on the location information stored in the vehicle information DB 311, for example. The vehicle selection unit 302 determines the vehicles 10 that do not output the provision request as the vehicles 10 that can perform operation even with the component 40 being provided to the first vehicle 10A.

The operation command generation unit 303 generates operation commands corresponding to the first vehicle 10A and the second vehicle 10B, respectively. When it is not necessary to transfer the component 40, the operation command generation unit 303 generates operation commands such that the first vehicle 10A and the second vehicle 10B tour prescribed routes. When it is necessary to transfer the component 40, the operation command generation unit 303 generates an operation command commanding the second vehicle 10B to move to the factory F1, and remove the component 40 in the factory F1. The operation command generation unit 303 further generates an operation command commanding the first vehicle 10A to move to the factory F1, and attach the component 40 in the factory F1. The operation command generation unit 303 transmits the generated operation commands to the corresponding vehicles 10. The operation command generation unit 303 according to the present embodiment may generate the moving routes based on the map information stored in the map information DB 312 described later. The moving routes are generated such that the routes conform to a predetermined rule, such as the vehicle 10 moves a shortest distance, and the vehicle 10 moves for a shortest time. In this case, the operation command generation unit 303 transmits the operation commands including the moving routes to the vehicles 10.

The vehicle information DB 311 is formed of vehicle information stored in the auxiliary storage 33. In the vehicle information DB 311, the vehicle IDs and the vehicle information are associated with each other. The vehicle information includes location information transmitted from the vehicles 10.

The movement information DB 312 stores map data, and map information including point of interest (POI) information such as characters and photographs indicating the features of each point on the map data. The map information DB 312 may be provided from other systems connected to the network N1, such as a geographic information system (GIS). The map data includes information regarding the locations of factories where the component 40 can be attached and detached.

Functional Configuration: Vehicle

Figure 5:
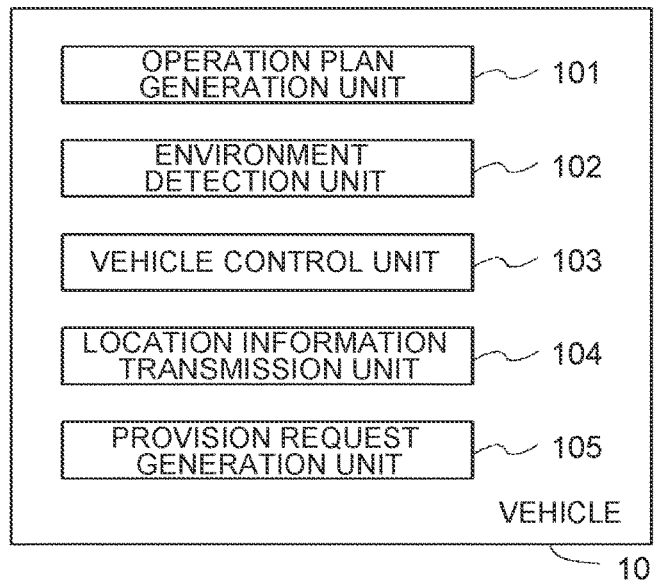
FIG. 5 illustrates an example of the functional configuration of the vehicle.

FIG. 5 illustrates an example of the functional configuration of the vehicle 10. The vehicle 10 includes an operation plan generation unit 101, an environment detection unit 102, a vehicle control unit 103, a location information transmission unit 104, and a provision request generation unit 105 as functional components. The operation plan generation unit 101, the environment detection unit 102, the vehicle control unit 103, the location information transmission unit 104, and the provision request generation unit 105 are functional components provided when, for example, the processor 11 of the vehicle 10 executes various programs stored in the auxiliary storage 13.

The operation plan generation unit 101 acquires an operation command from the server 30, and generates an operation plan of the own vehicle. Based on the operation command given from the server 30, the operation plan generation unit 101 calculates a moving route of the vehicle 10, and generates an operation plan for moving along the moving route.

Based on the data acquired by the environment information sensor 18, the environment detection unit 102 detects the environment around the vehicle 10 necessary for autonomous travel. Examples of detection targets include the number and location of lanes, the number and location of other mobile objects present around the vehicle 10, the number and location of obstacles (for example, pedestrians, bicycles, structures, buildings, and the like) present around the own vehicle, the structure of roads, and road signs. However, the detection targets are not limited to these. The detection targets may be any objects as long as the objects are necessary for autonomous travel. For example, when the environment information sensor 18 is a stereoscopic camera, objects around the vehicle 10 are detected by performing image processing of image data imaged by the stereoscopic camera. The data regarding the environment around the vehicle 10 (hereinafter, environment data) detected by the environment detection unit 102 is transmitted to the later-described vehicle control unit 103.

The vehicle control unit 103 generates a control command for controlling autonomous travel of the vehicle 10, based on the operation plan generated by the operation plan generation unit 101, the environment data generated by the environment detection unit 102, and the location information regarding the vehicle 10 acquired by the location information sensor 17. For example, the vehicle control unit 103 generates a control command to make the vehicle 10 travel along a prescribed route while preventing obstacles from entering into a prescribed safety area around the own vehicle 10. The Generated control command is transmitted to the driving unit 19. As a method of generating the control command for achieving autonomous movement of the vehicle 10, a publicly-known method may be adopted.

The location information transmission unit 104 transmits the location information acquired from the location information sensor 17 to the server 30 through the communication unit 16. The timing when the location information transmission unit 104 transmits the location information can properly be set. For example, the location information transmission unit 104 may periodically transmit the location information, transmit in accordance with the timing of transmitting some other information to the server 30, or may transmit in response to a request from the server 30. The location information transmission unit 104 transmits to the server 30 the location information together with the identification information (vehicle ID) for uniquely identifying the own vehicle.

The provision request generation unit 105 generates a provision request, when the output value of the function information sensor 20 indicates the decrease in function of the component 40. The range of the values indicating the decrease in function of the component 40 is determined based on an allowable range. The range is obtained in advance by an experiment, simulation, or the like. The provision request generation unit 105 transmits the generated provision request to the server 30 through the communication unit 16. The vehicle 10 may transmit the output value of the function information sensor 20 to the server 30, and the server 30 may detect the decrease in function of the component 40 based on the output value of the function information sensor 20. In this case, the timing of transmitting the output value of the function information sensor 20 may properly be set. For example, the output value may be transmitted periodically, transmitted in accordance with the timing when some other information is transmitted to the server 30, or may be transmitted in response to a request from the server 30.

Process Flow: Server

Figure 6:
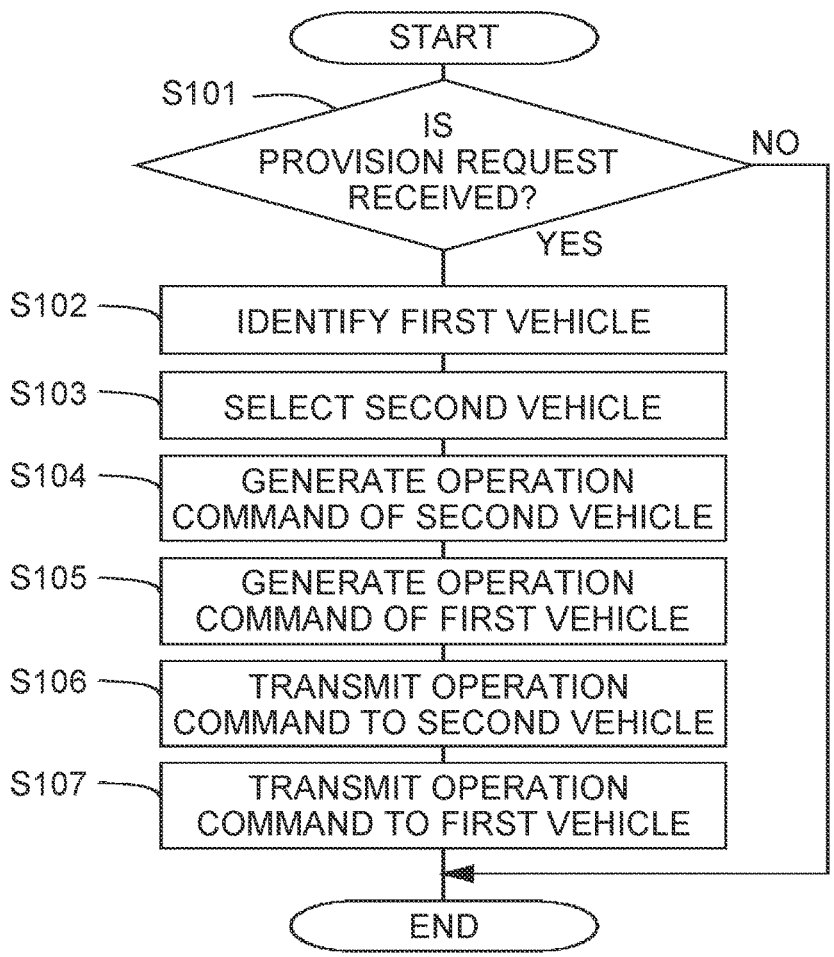
FIG. 6 is an example of the flowchart of a process of transmitting an operation command according to the first embodiment.

Next, description will be given of the process in which the server 30 transmits an operation command to the vehicle 10. FIG. 6 is an example of the flowchart of a process of transmitting an operation command according to the present embodiment. The process shown in FIG. 6 is executed by the processor 31 of the server 30 every prescribed time. Here, it is assumed that the server 30 receives in advance the information necessary for constructing the vehicle information DB 311. The component 40 is assumed to be compatible in all the vehicles 10.

In step S101, the vehicle selection unit 302 determines whether or not a provision request is received. When positive determination is made in step S101, the process proceeds to step S102. When negative determination is made, the present routine is ended.

In step S102, the vehicle selection unit 302 identifies the first vehicle 10A. The vehicle selection unit 302 identifies the first vehicle 10A based on the vehicle ID included in the provision request. At the time, the vehicle selection unit 302 acquires information regarding the component 40 that is requested by the first vehicle 10A to provide, and location information on the first vehicle 10A.

Next, in step S103, the vehicle selection unit 302 selects the second vehicle 10B. The vehicle selection unit 302 accesses the vehicle information DB 311, and selects, for example, the vehicle 10 that is currently located nearest to the factory F1 as the second vehicle 10B. The vehicle selection unit 302 determines the vehicles 10 that do not transmit the provision request as the vehicles 10 that can provide the component 40. The vehicle selection unit 302 selects the second vehicle 10B out of these vehicles 10 that do not transmit the provision request. The vehicle selection unit 302 may determine whether or not the vehicles 10 are able to travel even with the component 40 being provided, based on the output value of the function information sensor 20 of the respective vehicles 10. Then, the vehicle selection unit 302 may select as the second vehicle 10B the vehicle 10 that is determined to be able to travel.

In step S104, the operation command generation unit 303 generates an operation command for the second vehicle 10B. The operation command generation unit 303 generates an operation command commanding the second vehicle 10B to move to the factory F1 and remove the component 40 in the factory F1.

In step S105, the operation command generation unit 303 generates an operation command for the first vehicle 10A. The operation command generation unit 303 generates an operation command commanding the first vehicle 10A to move to the factory F1, and replace the component 40 in the factory F1.

In the factory F1, the component 40 may manually be removed from the second vehicle 10B, and be mounted on the first vehicle 10A, or the component 40 may be removed from the second vehicle 10B, and be mounted on the first vehicle 10A by an automated machine. The replacement of the component 40 may be performed, for example, in the parking lots or the like, instead of in the factory F1. The second vehicle 10B may move to the current location of the first vehicle 10A and may provide the component 40. The vehicle control unit 103 may control the facility necessary for transferring the component 40.

Figure 7:
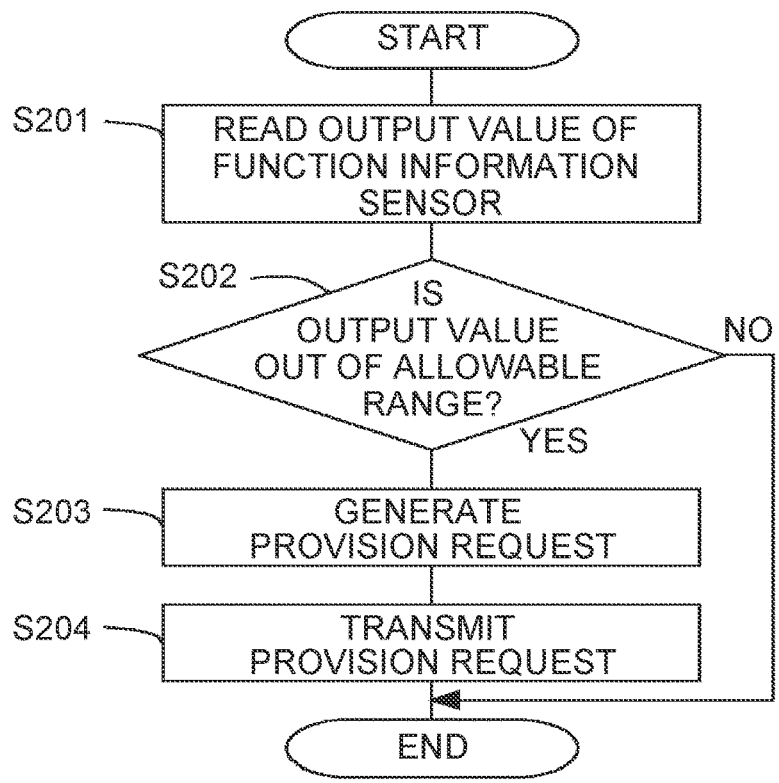
FIG. 7 is an example of the flowchart of a process of transmitting a provision request from a first vehicle according to the embodiment.

In step S106, the operation command generation unit 303 transmits the operation command to the second vehicle 10B. In step S107, the operation command generation unit 303 transmits the operation command to the first vehicle 10A.
Process Flow: Provision Request Transmitted by First Vehicle 10A Next, description will be given of the process in which the first vehicle 10A transmits a provision request. FIG. 7 is an example of a flowchart showing a process of transmitting a provision request from the first vehicle 10A according to the present embodiment. The process shown in FIG. 7 is executed by the provision request generation unit 105 every prescribed time.

Figure 8:
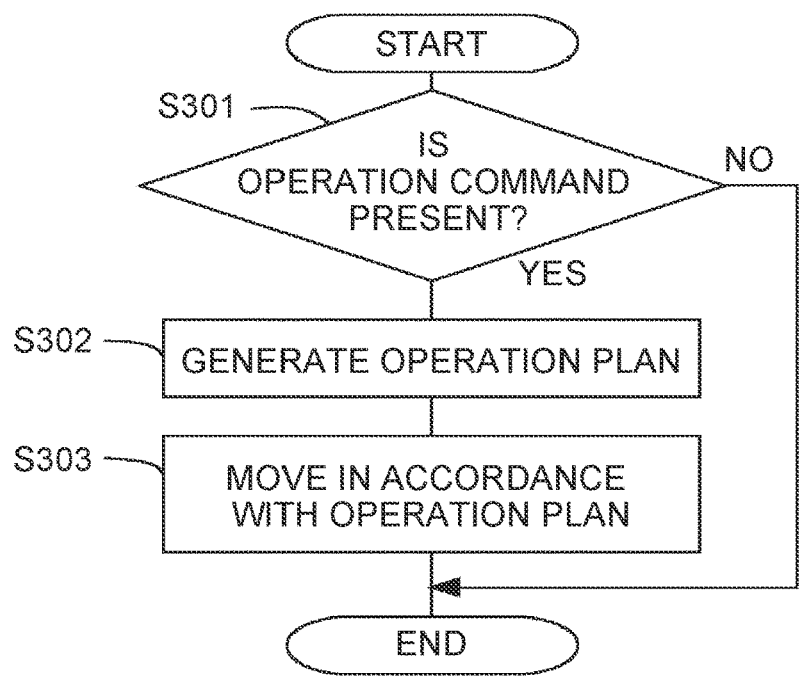
FIG. 8 is an example of the flowchart of a process of causing a vehicle to travel according to the first embodiment.

In step S201, the provision request generation unit 105 reads an output value of the function information sensor 20. In step S202, the provision request generation unit 105 determines whether or not the output value of the function information sensor 20 is out of an allowable range. The allowable range is a travelable range, or a range estimated to be travelable. The allowable range is set in advance. In step S202, the provision request generation unit 105 determines or estimates travel inability of the own vehicle. When positive determination is made in step S202, the process proceeds to step S203. When negative determination is made, the present routine is ended. In step S203, the provision request generation unit 105 generates a provision request. In step S204, the provision request generation unit 105 transmits the provision request to the server 30.
Process Flow: Travel of Vehicle Next, the process of making the vehicle 10 travel will be described. FIG. 8 is an example of a flowchart showing the process of making the vehicle 10 travel according to the present embodiment. The process shown in FIG. 8 is executed by the processor 11 of the vehicle 10 every prescribed time.

In step S301, the operation plan generation unit 101 determines whether or not an operation command is received from the server 30. When positive determination is made in step S301, the process proceeds to step S302. When negative determination is made, the present routine is ended. In step S302, the operation plan generation unit 101 generates an operation plan in accordance with the operation command. In step S303, the vehicle control unit 103 generates a control command in accordance with the operation plan. In accordance with the control command, the driving unit 19 is controlled, and the vehicle 10 is made to move (travel). When receiving a new operation command from the server 30, the vehicle 10 generates an operation plan based on the new operation command, even while the vehicle 10 is traveling based on the operation command received from the server 30 before.

According to the present embodiment described in the foregoing, the component 40 is provided from the second vehicle 10B when decrease in function of the component 40 occurs in the first vehicle 10A. Hence, a travelable distance of the first vehicle 10A can be lengthened. This makes it possible to prevent travel inability of the first vehicle 10A.

Second Embodiment

In a second embodiment, the vehicles 10 communicate with each other to transfer the component 40 without through the server 30. The vehicles 10 may directly communicate with each other by vehicle-to-vehicle communication, or may communicate through the network N1 such as the Internet described in the first embodiment.

Figure 9:
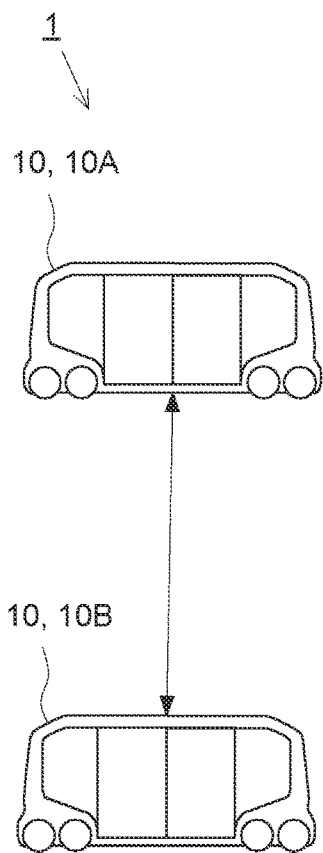
FIG. 9 shows a schematic configuration of an autonomous driving system according to a second embodiment.

FIG. 9 shows a schematic configuration of the autonomous driving system 1 according to the second embodiment. For example, the autonomous driving system 1 includes vehicles 10 (the first vehicle 10A and the second vehicle 10B in FIG. 9). The vehicles 10 shown in FIG. 9 can communicate each other using the vehicle-to-vehicle communication. In the example shown in FIG. 9, the vehicle-to-vehicle communication is performed between the first vehicle 10A and the second vehicle 10B. Since the hardware configuration of the vehicles 10 are similar to that in the first embodiment, the description thereof is omitted. Each of the vehicles 10 performs vehicle-to-vehicle communication through the communication unit 16.

Figure 10:
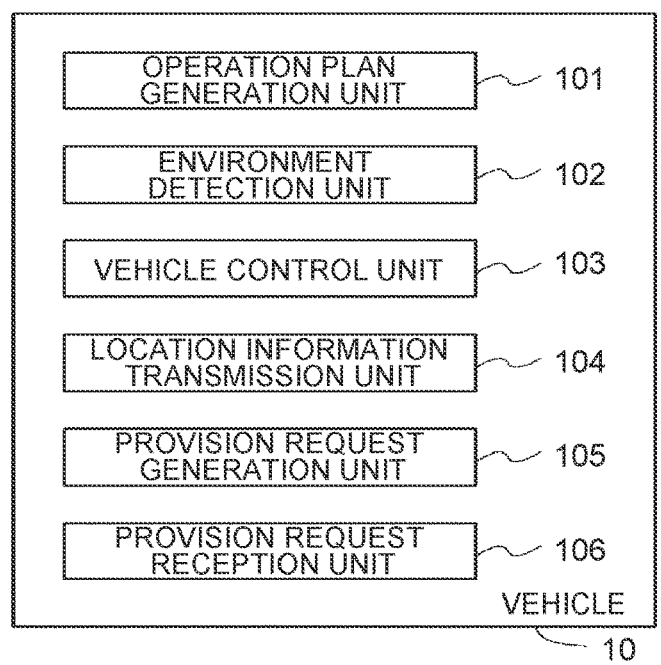
FIG. 10 shows an example of the functional configuration of the vehicle according to the second embodiment.

The provision request generation unit 105 of the first vehicle 10A transmits a provision request to surrounding vehicles 10 through the communication unit 16. The provision request herein refers to information including the identifier (vehicle ID) of the first vehicle 10A, and the identifier (component ID) of the component 40. The information is used for requesting provision or replacement of the component 40 to the surrounding vehicles 10. The second vehicle 10B is the vehicle 10 that travels in the range where vehicle-to-vehicle communication with the first vehicle 10A. The second vehicle 10B is the vehicle 10 that receives the provision request output from the second vehicle 10B and provides the component 40 to the first vehicle 10A.
Functional Configuration: Vehicle FIG. 10 shows an example of a functional configuration of the vehicle 10 according to the second embodiment. The vehicle 10 includes an operation plan generation unit 101, an environment detection unit 102, a vehicle control unit 103, a location information transmission unit 104, a provision request generation unit 105, and a provision request reception unit 106 as functional components. The operation plan generation unit 101, the environment detection unit 102, the vehicle control unit 103, the location information transmission unit 104, the provision request generation unit 105, and the provision request reception unit 106 are functional components provided when, for example, the processor 11 of the vehicle 10 executes various programs stored in the auxiliary storage 13. Since the environment detection unit 102, the vehicle control unit 103, the location information transmission unit 104, and the provision request generation unit 105 are similar to those in the first embodiment, the description thereof is omitted.

The provision request reception unit 106 of the second vehicle 10B determines whether or not the second vehicle 10B can provide the component 40 when a provision request is received from the first vehicle 10A. When there is no decrease in function of the component 40 in the second vehicle 10B (i.e., when the second vehicle 10B does not generate a provision request), the provision request reception unit 106 may determine that the second vehicle 10B can provide the component 40 to the first vehicle 10A. The provision request reception unit 106 may also determine whether or not the second vehicle 10B is able to travel even with the component 40 being provided to the first vehicle 10A. When the second vehicle 10B is able to travel, the provision request reception unit 106 may determine that the second vehicle 10B can provide the component 40 to the first vehicle 10A. When determining that the second vehicle 10B can provide the component 40 to the first vehicle 10A, the provision request reception unit 106 generates an operation command for the second vehicle 10B. The provision request reception unit 106 generates an operation command commanding the second vehicle 10B to move to the current location of the first vehicle 10A and provide the component 40 to the first vehicle 10A at the current location of the first vehicle 10A.

The operation plan generation unit 101 of the second vehicle 10B generates an operation plan based on the operation command. The operation plan generation unit 101 calculates a moving route from the current location of the second vehicle 10B to the current location of the first vehicle 10A based on information regarding the current location of the first vehicle 10A received from the first vehicle 10A and location information on the second vehicle 10B acquired by the location information sensor 17, and generates an operation plan for moving along the moving route. Once the second vehicle 10B arrives at the current location of the first vehicle 10A, the vehicle control unit 103 executes a process of providing the component 40 from the second vehicle 10B to the first vehicle 10A. The process is determined in advance. Meanwhile, the first vehicle 10A waits at the current location until receiving the component 40 from the second vehicle 10B.

Process Flow: Second Vehicle 10B

Next, description will be given of the process where the second vehicle 10B provides the component 40 to the first vehicle 10A. FIG. 11 is an example of a flowchart showing the process where the second vehicle 10B provides the component 40 to the first vehicle 10A according to the second embodiment. The process shown in FIG. 11 is executed by the processor 11 of the second vehicle 10B every prescribed time.

In step S401, the provision request reception unit 106 determines whether or not a provision request is received. When positive determination is made in step S401, the process proceeds to step S402. When negative determination is made, the present routine is ended.

In step S402, the provision request reception unit 106 identifies the first vehicle 10A. The provision request reception unit 106 identifies the first vehicle 10A based on the vehicle ID included in the provision request, while acquiring information regarding the component 40 that is requested by the first vehicle 10A to provide, and the location information on the first vehicle 10A.

Next, in step S403, the provision request reception unit 106 generates an operation command commanding to move to the current location of the first vehicle 10A and provide the component. In step S404, the operation plan generation unit 101 generates an operation plan in accordance with the operation command. In step S405, the vehicle control unit 103 generates a control command in accordance with the control plan. In accordance with the control command, the driving unit 19 is controlled, and the vehicle 10 is made to move (travel). After providing the component 40 to the first vehicle 10A, the vehicle 10B may resume operation in accordance with the operation command before receiving the provision request.

Since the process of the first vehicle 10A transmitting the provision request to the second vehicle 10B may be regarded as the same process as in the flowchart shown in FIG. 7, the description thereof is omitted. In step S204, the provision request is transmitted to the second vehicle 10B.

According to the present embodiment described in the foregoing, when decrease in function of the component 40 occurs in the first vehicle 10A, the component 40 is provided from the second vehicle 10B even without the server 30. Hence, the travelable distance of the first vehicle 10A can be lengthened. This makes it possible to prevent travel inability of the first vehicle 10A.

OTHER EMBODIMENTS

The aforementioned embodiments are merely examples. The present disclosure can suitably be changed and implemented without departing from the scope of the present disclosure. In the first embodiment, the vehicle 10 that does not issue a provision request is determined to have no function decrease in component 40, and therefore, the pertinent vehicle 10 is selected as the second vehicle 10B. Instead of this, the server 30 may recognize the state of the component 40 in each of the vehicles 10. For example, each of the vehicles 10 may periodically transmit the detection value of the function information sensor 20 to the server 30, or each of the vehicles 10 may determine the state of the component 40 based on the detection value of the function information sensor 20, and may periodically transmit the determination result to the server 30. The second vehicle 10B may be selected out of the vehicles 10 capable of providing one component 40 or part of the component 40 while traveling with the other component 40 or the remaining part of the component 40. In the second embodiment, upon reception of a provision request from the first vehicle 10A, the vehicle 10 may detect the state of the component 40 in the own vehicle with the function information sensor 20. The vehicle 10 may provide the component 40 to the first vehicle 10A when the vehicle 10 is capable of providing one component 40 or part of the component 40 while traveling with the other component 40 or the remaining part of the component 40.

In the case where the first vehicle 10A becomes unable to travel due to shortage of fuel, and therefore the second vehicle 10B provides fuel to the first vehicle 10A, the second vehicle 10B may provide fuel to the first vehicle 10A, while keeping in the second vehicle 10B the amount of fuel necessary for the second vehicle 10B to travel. In the case where the first vehicle 10A becomes unable to travel due to an insufficient SOC of the battery, and the second vehicle 10B supplies electric power to the first vehicle 10A to charge the battery of the first vehicle 10A, the second vehicle 10B may supply electric power to the battery of the first vehicle 10B, while keeping in the second vehicle 10B the SOC necessary for the second vehicle 10B to travel. It is also possible that two or more second vehicles 10 provide fuel or electric power to the first vehicle 10A.

The processes or devices described in the present disclosure can freely be combined and implemented without departing from the range of technical consistency.

Moreover, the process described to be performed by one apparatus may be executed by a plurality of apparatuses in cooperation with each other. Alternatively, the processes described to be executed by different apparatuses may be executed by one apparatus. In the computer system, the hardware configuration (server configuration) that implements each function may flexibly be changed. In the embodiments disclosed, the server 30 includes the vehicle management unit 301, the vehicle selection unit 302, the operation command generation unit 303, the vehicle information DB 311, and the map information DB 312 as functional components. However, some or all of these functional components may be included in the vehicle 10. For example, instead of the server 30, the vehicle 10 may be disposed in each area. The vehicles 10 may each have the same function as the server 30. In that case, a provision request may be transferred sequentially to the surrounding vehicles 10 using vehicle-to-vehicle communication. For example, in the second embodiment, another vehicle 10 may be present between the first vehicle 10A and the second vehicle 10B to relay the provision request.

The present disclosure can also be implemented when a computer program, mounted with the functions described in the embodiments, is supplied to a computer, and one or more processors included in the computer read and execute the program. Such a computer program may be provided to the computer by a non-transitory computer readable storage medium that is connectable with a system bus of the computer, or may be provided to the computer through a network. Examples of the non-transitory computer readable storage medium include disks of any type, including magnetic disks (such as floppy (registered trademark) disks, and hard disk drives (HDDs)) and optical discs (such as CD-ROMs, DVD discs, Blu-ray Discs), and media of any type suitable for storing electronic commands, including read only memories (ROMs), random-access memories (RAMs), EPROMs, EEPROMs, magnetic cards, flash memories, and optical cards.

What is claimed is:

1. A vehicle configured to travel autonomously, comprising:
   a processor configured to execute:
      detecting or estimating travel inability of the vehicle based on output value of a function information sensor, wherein the travel inability is caused by a decrease in function of a component;
      outputting, when detecting or estimating the travel inability of the vehicle, information regarding a request for receiving an article provided from another vehicle to avoid the travel inability;
      determining that the other vehicle outputs information regarding a request for receiving an article provided from the vehicle;
      while controlling the vehicle to travel autonomously, determining whether the vehicle is able to continue to travel even with the article, corresponding to the request for receiving the article provided from the vehicle, being provided to the other vehicle when determining that the other vehicle outputs information regarding the request for receiving the article provided from the vehicle, wherein the article has been mounted on the vehicle prior to the determining whether the vehicle is able to continue to travel without the article; and
      performing, when determining that the vehicle is able to travel even with the article, corresponding to the request for receiving the article provided from the vehicle, being provided from the vehicle, a prescribed process for providing the article, corresponding to the request for receiving the article provided from the vehicle, to the other vehicle, the article provided from the vehicle being usable in the vehicle and the other vehicle, wherein the prescribed process includes a process of generating an operation command for the vehicle to move from a current location to a determined location for providing the article to the other vehicle, the determined location comprising a factory where the article is to be removed from the vehicle and to be mounted on the other vehicle.

2. The vehicle according to claim 1, wherein the prescribed process includes a process of moving the vehicle in accordance with the operation command.

3. The vehicle according to claim 2, wherein the determined location further includes a location where the vehicle can park.

4. The vehicle according to claim 3, wherein the determined location further includes a road, or a parking lot.

5. The vehicle according to claim 1, wherein the determined location further includes a location where the vehicle can park.

6. The vehicle according to claim 5, wherein the determined location further includes a road, or a parking lot.

7. The vehicle according to claim 1, wherein the article provided from the vehicle is in use in the vehicle.

8. The vehicle according to claim 7, wherein the article provided from the vehicle is one of a plurality of batteries mounted in the vehicle.

9. The vehicle according to claim 1, wherein the article provided from the vehicle is one of a plurality of batteries mounted in the vehicle.

10. The vehicle according to claim 1, wherein the article provided from the vehicle is fuel of the vehicle.

11. The vehicle according to claim 1, wherein the article provided from the vehicle is electric power.

12. A method of information processing, comprising:
   detecting or estimating travel inability of an own vehicle configured to travel autonomously based on output value of a function information sensor, wherein the travel inability is caused by a decrease in function of a component;
   outputting, when detecting or estimating the travel inability of the own vehicle, information regarding a request for receiving an article provided from another vehicle to avoid the travel inability;
   determining that the other vehicle outputs information regarding a request for receiving an article provided from the own vehicle;
   while controlling the vehicle to travel autonomously, determining whether the own vehicle is able to continue to travel even with the article, corresponding to the request for receiving the article provided from the own vehicle, being provided to the other vehicle when determining that the other vehicle outputs information regarding the request for receiving the article provided from the own vehicle, wherein the article has been mounted on the vehicle prior to the determining whether the vehicle is able to continue to travel without the article; and
   performing, when determining that the own vehicle is able to travel even with the article, corresponding to the request for receiving the article provided from the own vehicle, being provided from the own vehicle, a prescribed process for providing the article, corresponding to the request for receiving the article provided from the own vehicle, to the other vehicle, the article provided from the own vehicle being usable in the own vehicle and the other vehicle, wherein the prescribed process includes a process of generating an operation command for the vehicle to move from a current location to a determined location for providing the article to the other vehicle, the determined location comprising a factory where the article is to be removed from the vehicle and to be mounted on the other vehicle.

13. A non-transitory computer readable medium storing a program which when executed by a computer causes the computer to perform a method, the method comprising:
   detecting or estimating travel inability of an own vehicle configured to travel autonomously based on output value of a function information sensor, that is out of an allowable range, indicating a decrease in function of a component;
   outputting, when detecting or estimating the travel inability of the own vehicle, information regarding a request for receiving an article provided from another vehicle to avoid the travel inability;
   determining that the other vehicle outputs information regarding a request for receiving an article provided from the own vehicle;
   while controlling the vehicle to travel autonomously, determining whether the own vehicle is able to continue to travel even with the article, corresponding to the request for receiving the article provided from the own vehicle, being provided to the other vehicle when determining that the other vehicle outputs information regarding the request for receiving the article provided from the own vehicle, wherein the article has been mounted on the vehicle prior to the determining whether the vehicle is able to continue to travel without the article; and
   performing, when determining that the own vehicle is able to travel even with the article, corresponding to the request for receiving the article provided from the own vehicle, being provided from the own vehicle, a prescribed process for providing the article corresponding to the request for receiving the article provided from the own vehicle to the other vehicle, the article provided from the own vehicle being usable in the own vehicle and the other vehicle, wherein the prescribed process includes a process of generating an operation command for the vehicle to move from a current location to a determined location for providing the article to the other vehicle, the determined location comprising a factory where the article is to be removed from the vehicle and to be mounted on the other vehicle.

* * * * *